2,091,576

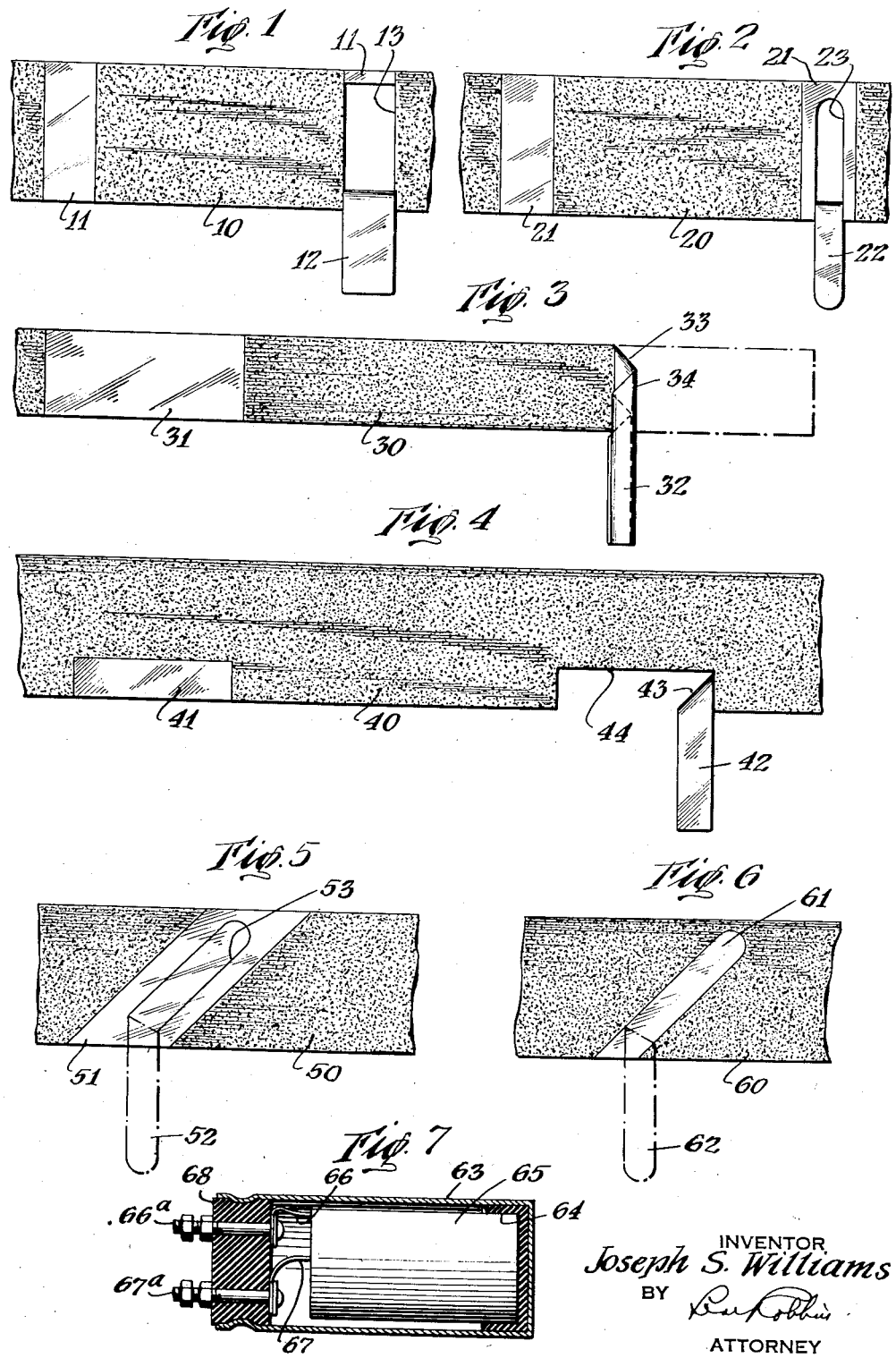
Aug. 31, 1937. J. S. WILLIAMS 2,091,576
ETCHED ELECTRODE
Filed Feb. 15, 1936 2 Sheets-Sheet 1
INVENTOR
Joseph S. Williams
BY
ATTORNEY Aug. 31, 1937.    J. S. WILLIAMS    2,091,576
ETCHED ELECTRODE
Filed Feb. 15, 1936    2 Sheets-Sheet 2
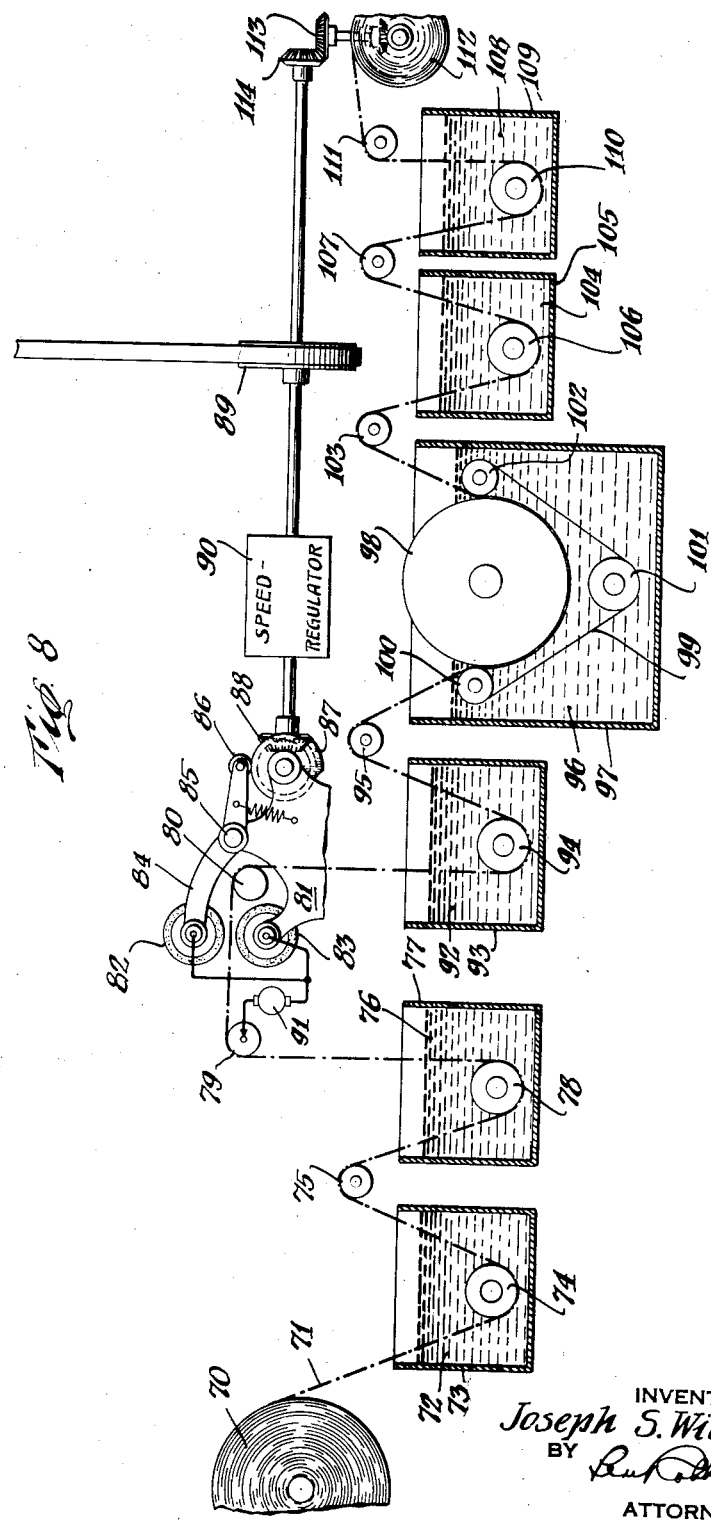
INVENTOR
Joseph S. Williams
BY
ATTORNEY Patented Aug. 31, 1937

UNITED STATES PATENT OFFICE 2,091,576

ETCHED ELECTRODE

Joseph Senn Williams, Indianapolis, Ind., assignor to P. R. Mallory & Co., Inc., Indianapolis, Ind., a corporation of Delaware Application February 15, 1936, Serial No. 64,012

12 Claims. (Cl. 175—315)

This invention relates to etched electrodes for electrolytic condensers and the like.

An object of the invention is to provide an etched electrode of improved type.

Other objects of the invention will be apparent from the following description and accompanying drawings taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawings, the scope of the invention being indicated in the appended claims.

For a fuller understanding of the nature and objects of the invention as well as for specific fulfillment thereof, reference should be had to the following detailed description taken in connection with the accompanying drawings, in which:

Figure 1 is a face view of a section of an etched electrode arranged according to one form of the invention;

Figure 2 indicates a slightly different construction;

Figure 3 is a face view of a narrower electrode;

Figure 4 shows a modified form of electrode;

Figure 5 shows a further modification;

Figure 6 represents a still further modification;

Figure 7 is a section of a condenser; and

Figure 8 illustrates an apparatus for etching the electrodes according to the present invention.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Electrodes for electrolytic devices are sometimes etched to increase their effective surface area. In the case of electrolytic condenser electrodes this materially increases the capacity obtainable per unit area of electrode surface.

In dry electrolytic condensers the electrodes are usually made of thin aluminum foil and are provided with terminals either secured to the foil or comprising tabs forming an integral part of the electrode foil. It has been found that the etching operation, while materially increasing the capacity, results in a certain amount of weakening of the electrode foil. This weakening, resulting from the reduction in cross section and from increased embrittlement of the foil, renders the tab connections less secure and more liable to failure.

According to one aspect of the present invention selected areas of the electrode are etched to obtain increased effective surface while other areas are left unetched to provide greater strength.

Referring to the drawings, Figure 1 shows a length of etched foil having etched sections 10 adapted to provide areas of enhanced capacity in the completed condenser and having unetched strips 11 extending across the foil at intervals. Strips 11 may be completely unetched, in which case their surfaces may appear the same as that of the original unetched foil, or the strips 11 may also be etched, but in a reduced degree, so that they present higher strength than the portions 10. It is preferred that both faces of the foil be treated similarly so that the difference in regions 10 and 11 will also be present on the opposite face.

In using the etched foil for an electrode in a dry electrolytic condenser it may be cut into suitable lengths so as to include one or more of the sections 11 for the terminal connections. The terminals may be applied to sections 11 either before or after cutting the foil into electrode lengths. They may comprise metal strips or wires attached to the foil, for instance in the manner set forth in H. F. Fruth Patent No. 2,020,408 on a Condenser foil terminal, or they may comprise tabs formed directly from the electrode metal itself. These tabs may be formed in one of the ways commonly used in the prior art or they may be formed as indicated in the various figures.

In Figure 1, for example, the tab 12 is formed by cutting a U-shaped slit in one of the sections 11 and folding out the tab so as to leave an aperture having its edges 13 bounded by the foil. This novel tab, as well as those shown in Figures 2, 5 and 6, is covered in a co-pending application of Omar L. Fluharty, Serial No. 64,052, filed February 15, 1936.

Figure 2 shows an etched foil 20 having unetched sections 21 and indicates how an improved tab 22 can be formed by cutting or punching at 23 so that the entire tab is surrounded by unetched foil.

Figure 3 shows a length of foil having etched sections 30 and long unetched sections 31. It is also indicated how a folded tab 32 may be formed by folding one of the sections 31 diagonally at 33 and refolding two or three more times as at 34 to give a tab of suitable width.

Figure 4 shows a foil having an etched surface 40 with unetched sections 41 along one edge at intervals. It is also indicated in this figure how a tab 42 can be formed by cutting along two edges 44 of the section 41 and folding diagonally at 43.

Figure 5 shows a foil having etched sections 50 and an unetched section 51 diagonally across the electrode. A tab may be provided by making a U-shaped cut at 53 and folding the tab out as indicated by 52.

In Figure 6 an unetched section 61 is left in the etched surface 60 of such shape as to suitably form a tab 62 when a cut is made around the edges.

Figure 7 shows a dry electrolytic condenser comprising a container 63 in which a condenser section 65 is enclosed, the section 65 comprising a pair of etched foils having unetched or partially etched sections for terminals as shown in the previous figures. The foil electrodes are spaced from each other and include between them an electrolyte adapted to maintain a current-blocking film thereon. At least one of the electrodes may preferably be film-formed before assembly. Condenser section 65 is embedded in pitch 64. A cover 68 is provided on container 63 and a pair of terminals 66a and 67a project therethrough. Tabs 66 and 67 are connected to the two electrodes, respectively, in one of the ways indicated in the preceding figures and are secured, respectively, to terminals 66a and 67a.

In order to prevent the attack of the foil sections selected for tabs during etching of the rest of the foil the sections may be kept from dipping into the etching bath or they may be treated or immunized to prevent or impede the attack of the etching medium. This may be done, for example, by coating the sections with a layer of paraffin or other immunizing substance, covering with a layer of paper or other sheet material adapted to retard etching action or by forming an integral film on the surface in a manner similar to that used in "anodizing" or in film-forming the electrodes of electrolytic condensers. It has also been found that etching can be inhibited by drying the foil section in air between the cleaning and etching steps.

Figure 8 shows a continuous process galvanic etching apparatus similar to that set forth in J. M. Booe Patent No. 2,052,962 for Process of etching but having added means for immunizing predetermined sections of the foil to the etching medium. As indicated in this figure unetched foil 71 is unwound from roll 70 and passes through a cleaning solution 72, such as caustic, in tank 73, the foil being guided by roller 74. On emerging from the cleaning solution the foil passes over roller 75 and into a tank 77 of wash water 76 guided by roller 78.

The foil then passes up over rollers 79 and 80 and then down into another tank 93 of wash water 92 guided by roller 94. An apparatus 81 is provided between rollers 79 and 80 for immunizing the predetermined sections which are to remain unetched.

Immunizing apparatus 81 comprises a pair of felt rollers 82 and 83 saturated with a suitable material for immunizing the foil. Roller 82 is supported on a lever arm 84 pivoted at 85 and provided with a small roller 86 adapted to ride on a cam 87.

Cam 87 is driven by a bevel gear 88 which is, in turn, driven by the driving means 89 which also draws the foil through the apparatus. An adjustable speed regulator 90 is provided between drive means 89 and bevel gears 88 so that the speed of the cam 87 can be controlled to give any desired spacing between the unetched sections. The regulator 90 may also provide for variable speed during each revolution of the cam to give any desired length to the immunized sections.

If it is desired to form an anodized film on the foil for immunization the rollers 82 and 83 may be saturated with a film-forming electrolyte, such as a solution of borax and boric acid. A D. C. generator 91 has one terminal connected to the foil 71 through roller 79 and the other terminal connected to the metal hubs of rollers 82 and 83 the foil being connected to the positive terminal.

In operation the cam 87 presses roller 82 down onto the foil 71 at predetermined intervals, the foil being displaced sufficiently to make contact also with roller 83. The sections of foil contacted by rollers 82 and 83 will become filmed with a thin layer which will prevent any substantial etching of these sections.

After having the predetermined sections immunized and passing through the second tank of wash water the foil is led up over roller 95 and then passes through etching tank 97 having an etching bath 96 therein. The foil passes between a pair of screens, one screen 99 being carried by three rollers 100, 101 and 102 and the other being mounted on the periphery of large roller 98. The etching bath, in co-operation with the screens causes an etching of the untreated areas of the foil surface but the immunized sections remain unattacked, or substantially so.

Upon leaving the etching tank the foil passes over roller 103 and through wash water 104 in tank 105 and wash water 108 in tank 109, guided by rollers 106, 107, 110 and 111. The foil is then wound onto roll 112, the mandrel therefor being driven by drive means 89 through bevel gears 113 and 114.

Instead of using a forming solution on rollers 82 and 83 they can be heated and soaked in melted paraffin for coating onto the foil. In this case generator 91 will not be required. Etching can also be inhibited by covering sections of the foil with strips of paper which will separate the foil and the wire screens.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. An electrode unit for electrolytic devices comprising a metal member having a section of its surface etched and a section of its surface unetched, and a terminal for said electrode on the unetched portion thereof.

2. An electrode unit for electrolytic devices comprising a metal member having a section of its surface fully etched and a section of its surface much less than fully etched whereby it is stronger than said fully etched section, and a terminal for said electrode connected to said section which is less than fully etched.

3. An electrode for electrolytic devices comprising a sheet of foil of film-forming metal, said foil having a first section of its surface etched and a second section of its surface substantially unetched, and a terminal for said electrode secured to said second section.

4. An electrode for electrolytic condensers comprising a strip of film-forming metal foil, a first section of said strip having an etched surface and a second section of said strip having a surface much less etched than the surface of said first section, and a terminal for said electrode connected to said second section.

5. An electrode for electrolytic condensers comprising a strip of film-forming metal foil, a first section of said strip having an etched surface and a second section of said strip having a surface much less etched than the surface of said first section, and a terminal tab integral with said second section.

6. An electrode for electrolytic condensers comprising a strip of film-forming metal foil, a first section of said strip having an etched surface and a second section of said strip having a surface much less fully etched than the surface of said first section, and a terminal tab integral with said second section and comprising a portion of the foil of said section.

7. An electrode for electrolytic condensers comprising a strip of metal foil, a section of said strip of foil being etched, a section of said strip of foil being unetched and a terminal for said electrode secured to said unetched section.

8. An electrode for electrolytic condensers comprising a strip of metal foil, a section of said strip of foil being etched, a section of said strip of foil being unetched, and a terminal connected to said unetched section.

9. An electrode for electrolytic condensers comprising a strip of metal foil, a section of said strip of foil being etched, a section of said strip of foil being unetched, and an integral terminal tab for said electrode comprising the material of said unetched section.

10. A dry electrolytic condenser comprising a container, a pair of electrode foils therein, at least one of which is etched to increase its effective area, and film-formed, a film-maintaining electrolyte between said electrodes and a pair of terminals connected to said electrodes, the etched electrode having a section much less fully etched than the remainder of the electrode surface, the terminal for said electrode being connected to said section.

11. An electrode for electrolytic condensers comprising a strip of metal foil, a first section of said foil being etched and a second section of said foil being much less etched than said first section, and a terminal connection for said electrode comprising the material of said second section and integral therewith.

12. An electrode for electrolytic condensers comprising a strip of metal foil, the major portion of which is etched and a small portion of which is much less etched than said major portion, and a terminal for said electrode comprising the material of said less etched portion and integral with said electrode.

JOSEPH SENN WILLIAMS.